United States Patent
Premkumar et al.

(10) Patent No.: US 8,151,048 B1
(45) Date of Patent: Apr. 3, 2012

(54) MANAGING STORAGE POOL PROVISIONING

(75) Inventors: Subbulakshmi Premkumar, Sudbury, MA (US); Paul O. Malenfant, Shrewsbury, MA (US); Russell R. Laporte, Webster, MA (US); Scott Von Rhee, Boston, MA (US); Paula E. McAdam, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 693 days.

(21) Appl. No.: 12/058,966

(22) Filed: Mar. 31, 2008

(51) Int. Cl.
*G06F 12/00* (2006.01)

(52) U.S. Cl. ............. 711/114; 711/154; 711/E12.001; 710/305; 726/1; 726/2

(58) Field of Classification Search .............. 711/114, 711/170, E12.001, 154, 163; 714/6, E11.034, 714/E11.084; 726/1, 2, 5
See application file for complete search history.

(56) References Cited

U.S. PATENT DOCUMENTS

| | | | | |
|---|---|---|---|---|
| 5,708,769 | A * | 1/1998 | Stallmo | 714/6 |
| 7,062,628 | B2 * | 6/2006 | Amano | 711/170 |
| 7,409,492 | B2 * | 8/2008 | Tanaka et al. | 711/103 |
| 7,792,882 | B2 * | 9/2010 | Moore et al. | 707/822 |
| 7,904,652 | B1 * | 3/2011 | Castelli et al. | 711/114 |
| 2005/0182992 | A1 * | 8/2005 | Land et al. | 714/701 |
| 2006/0029097 | A1 * | 2/2006 | McGee et al. | 370/468 |
| 2008/0147973 | A1 * | 6/2008 | Gruttadauria et al. | 711/114 |
| 2008/0276038 | A1 * | 11/2008 | Tanaka et al. | 711/103 |

* cited by examiner

*Primary Examiner* — Pierre-Michel Bataille
(74) *Attorney, Agent, or Firm* — Krishnendu Gupta; Jason A. Reyes; Deepika Bhayana

(57) ABSTRACT

A method is used in managing storage pool provisioning. One or more physical devices of a data storage system is configured for use in connection with provisioning a storage pool. A provisioning specification is received describing a RAID type and capacity. A rule is received describing one or more sets of data storage system best practices. Each of the one or more sets specifies data storage system best practices for a different type of data storage system including a first type associated with the data storage system. Configuration processing is performed in connection with initialization of the data storage system to configure a first portion of the one or more physical devices for use with the storage pool. A rules engine and best practices for the first type of data storage system specified in the rule are used in performing the configuration processing.

20 Claims, 12 Drawing Sheets

Storage Allocation Wizard

Create New Storage Pool

A new Storage Pool containing physical disks will be created using the parameters entered below.
Click here for more information on how the Storage Pool will be created.

Storage Pool Name: Thin Pool 1
Storage Pool Description: This Storage Pool is to be used to create Thin LUNs for the Finance department
RAID Type: RAID5 (recommended) ▽

Total Available Physical Capacity: 5TB
Capacity: 50 ▽  ○ GB  ○ TB  ● % of Available Space ☐ Show Storage Pool creation details when 'Next' is clicked < Back    Next >    Finish    Cancel

FIG. 11

MANAGING STORAGE POOL PROVISIONING

BACKGROUND

1. Technical Field

This application generally relates to managing storage pool provisioning.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

RAID (Redundant Array of Independent or Inexpensive Disks) parity schemes may be utilized to provide error detection during the transfer and retrieval of data across a storage system.

In the industry there have become defined several levels of RAID systems. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

In at least some cases, when a logical volume is configured so that its data is written across multiple disk drives in the striping technique, the logical volume is operating in RAID-0 mode. Alternatively, if the logical volume's parity information is stored on one disk drive and its data is striped across multiple other disk drives, the logical volume is operating in RAID-3 mode. If both data and parity information are striped across multiple disk drives, the logical volume is operating in RAID-5 mode.

Different tasks may be performed in connection with a data storage system. For example, a customer may perform data storage configuration and provisioning tasks. Such tasks may include, for example, configuring and provisioning storage. Tasks may include allocating storage, specifying the logical and/or physical devices used for the storage allocation, specifying whether the data should be replicated, the particular RAID level, and the like. With such options in connection with performing configuration and provisioning tasks, a customer may not have the appropriate level of sophistication and knowledge needed.

Certain software applications use rule processing techniques, e.g., to direct data to various locations. As an example, Microsoft Outlook email processing software, manufactured by Microsoft Corporation of Redmond Wash., provides an email client program that can use rule processing to direct the placement of email messages within a user's various mailbox folders. A rule mechanism is provided to allow a user to establish rules that can, for instance, select an incoming email message, based on a source address, and deposit that message into a specific mailbox folder. Rule applicability can be conditioned on things such as specific words that might appear in an email message, or on destination or source email addresses. A user may also specify exceptions that define criteria for not applying a rule to routing of email messages. Rules in this system can also specify an action to be taken on the email message, such as, for example, deleting the email and to stop processing other rules once the rule is complete.

SUMMARY OF THE INVENTION

A method is used in managing storage pool provisioning. One or more physical devices of a data storage system is configured for use in connection with provisioning a storage pool. A provisioning specification is received describing a RAID type and capacity. A rule is received describing one or more sets of data storage system best practices. Each of the one or more sets specifies data storage system best practices for a different type of data storage system including a first type associated with the data storage system. Configuration processing is performed in connection with initialization of the data storage system to configure a first portion of the one or more physical devices for use with the storage pool. A rules engine and best practices for the first type of data storage system specified in the rule are used in performing the configuration processing.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9-11 are examples illustrating user interface mechanisms that may be used with the techniques herein.

DETAILED DESCRIPTION OF EMBODIMENT(S)

As described below, a provisioning technique is provided that may be used with capacity based rules for provisioning virtual storage applying best practices.

Conventionally, configuring a storage pool (described below) was done by the user through either selecting from available disks or allowing the system to automatically choose the disks given the RAID type and the number of disks chosen.

In accordance with the provisioning technique, a rules layer contains rules including business logic to translate a user requirement pertaining to capacity and RAID protection into a best practices configuration that the targeted storage system can support. An application layer (user interface) uses the rules layer to reduce the complexity for the novice storage administrator to provision virtual storage. The rules eliminate or reduce the need for the user to be aware of how many disks and RAID groups are necessary to provide the required capacity. The rules apply best practices to provide the best practices configuration, e.g., in order to accommodate virtual storage provisioning. At least one implementation has the flexibility to allow options based on best practices for the more advanced user who would like to have some control on factors such as cost, performance, and high availability.

Thus, the provisioning technique provides ease of use and requires less storage management expertise from the user who nonetheless knows how much storage capacity is needed to be provisioned but is not concerned about which particular disks are selected.

In at least one implementation, the user is given the ability to specify just the capacity and RAID type, with the software then determining how best to fulfill the requested specification. In at least one implementation, the user is given the flexibility of being offered optional configurations from which the user can choose, and a best practices engine guides or validates a configuration.

Figure 1:
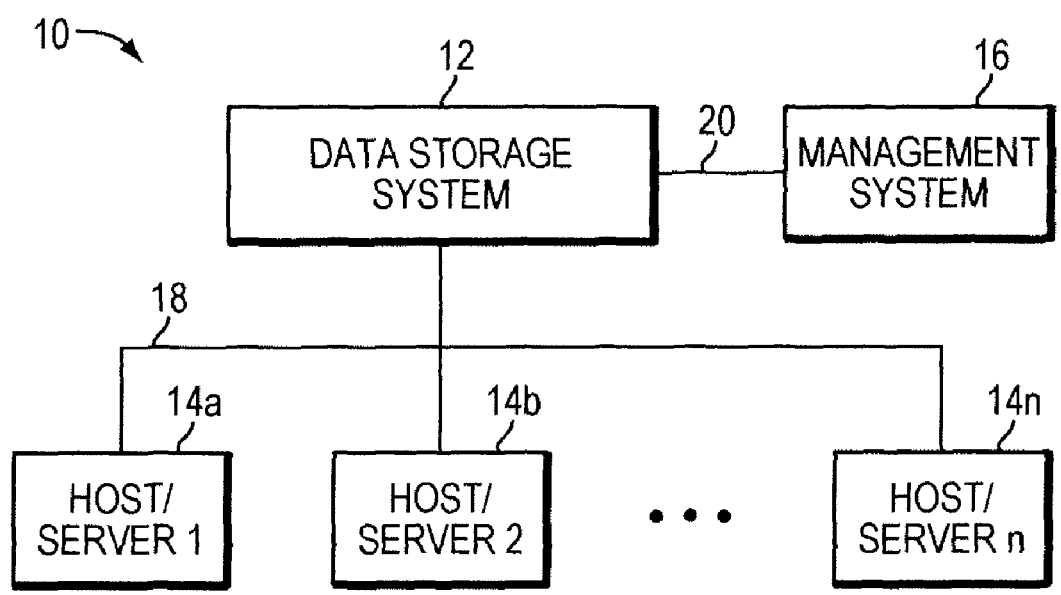
FIG. 1 is an example of an embodiment of a system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage request to provision or configure data storage.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in following paragraphs are techniques that may be used to assist customers of a data storage system in connection with performing data storage system management tasks such as related to data storage system configuration, provisioning of data storage, and the like. The techniques herein may be adaptable to the particular knowledge level of the user. The techniques are flexible and allow for implementation of best practices and defaults in an automated fashion which may be customized for the user or customer and/or underlying data storage system and environment to meet specific customer needs. As will be described in more detail, depending on the level at which a user interacts with the data storage system, different levels or amounts of automation of the best practices may be performed. Depending on how the data storage system is configured, the user may elect to bypass the automation of best practices or limit the amount of automation performed by interacting with the system at various levels. User proficiency levels and exemplary embodiments are described in more detail in U.S. patent application Ser. No. 11/824,578, filed Jun. 29, 2007, APPLICATION AWARE STORAGE, which is incorporated by reference herein.

What will be described herein are techniques that may be used in connection with performing data storage configuration and provisioning of the data storage in connection with a request, for example, to allocate a portion of data storage for use with an application hosting data on a data storage system.

Figure 2:
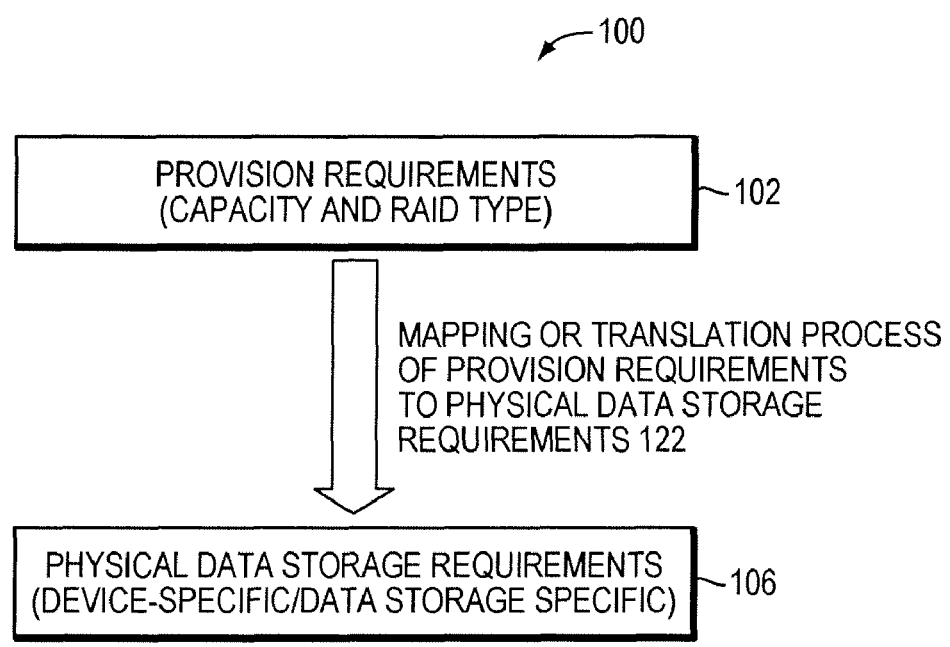
FIG. 2 is an example representation of the mapping or translation processes that may be performed in an embodiment in accordance with the techniques herein.

Referring to FIG. 2, shown is an example representation of the processing that may be performed in an embodiment in accordance with the techniques herein. The example 100 illustrates the processing that may be performed in connection with a request to provision storage of a data storage system. For example, a provisioning request may be made to allocate storage for a particular capacity and RAID type. The example 100 includes provision requirements 102 which may be mapped or translated into physical storage requirements 106 in a mapping or translation stage 122. The mapping stage 122 may be performed in accordance with data storage best practices. The steps comprising stage 122 may vary with each situation and may vary with the particular underlying data storage system.

The best practices implemented as part of 122 in an embodiment may be based on experience, know-how, testing, and the like, in connection with provisioning and configuring storage for a particular data storage system. The mapping performed in the stage 122 may vary with each data storage system provided by a same vendor or different vendor. For example, EMC Corporation provides the Symmetrix® data storage system and the CLARiiON® data storage system. A different set of processing steps may be performed for each of the foregoing data storage systems in accordance with data storage system specific best practices in connection with the stage 122. The best practices may be codified in accordance with techniques herein to provide for automatically provisioning data storage system resources. An embodiment utilizing the techniques herein may implement the best practices using executable code which is executed on the data storage system when processing a request to provision storage and/or configure storage for use with the techniques herein. As will be described in more detail herein, the best practices may be codified using any one of a variety of different techniques known in the art such as, for example, using a script language, rules, programming language, and the like. Although reference may be made to particular ways in which the techniques herein may be implemented for purposes of example and illustration, such reference should not be construed as a limitation of the techniques herein.

The requirements 102 and the mapping stage 122 will now be described in more detail.

The provision requirements 102 may specify the one or more provisioning requirements for a request. The provision requirements 102 may be the user inputs for the provisioning request received via a user interface (UI) using any one of a variety of different supported interfaces and techniques. The provision requirements 102 may vary with user level for which the provisioning request is issued.

In one embodiment, the UI may provide for one or more different types of user interfaces and associated data. For example, the UI may provide support for a graphical user interface (GUI), command line interface (CLI), and the like. As also described herein, one or more different user levels may be provided in accordance with different levels of user proficiency. A user may interact with a system utilizing the techniques herein at any one of the user proficiency levels. The provision requirements 102 may vary with each of the different user proficiency levels of interaction that may be provided in an embodiment. Each of the different user levels may provide a different logical view and level of abstraction with respect to a data storage task to be performed. Each of the different user levels may provide a different level of detail with respect to the underlying operations and tasks performed on the data storage system in accordance with different levels of user sophistication and knowledge. The language or terminology of the UI and provision requirements 102, UI data (e.g., content or data used to populate the UI menus), and UI presentation or structure (e.g., commands presented or particular hierarchical menu structure) may vary in accordance with the particular user level at which a user interacts with the data storage system. Thus, a user may interact with the data storage system at a variety of different levels when issuing data storage configuration requests. The UI and provision requirements may be customized for the particular level for which the request is performed.

The physical storage devices of the data storage system may be configured or partitioned into storage pools for use in connection with specifying requirements of 102. An embodiment may form one or more such storage pools for use in connection with servicing a provisioning request prior to the issuance of the provisioning request. In other words, the physical storage devices may be configured into one or more storage pools at a first point in time. At a second later point in time, storage may be allocated from the previously formed storage pools in connection with a provisioning request to allocate storage on the data storage system. Storage pools may be formed at different points in time in connection with the life cycle of a data storage system and a defined policy. For example, storage pools may be formed as part of data storage system initialization and startup processing and when new data storage devices are added to a data storage system. An embodiment may also form storage pools as part of processing in response to receiving a provisioning request.

Figure 3:
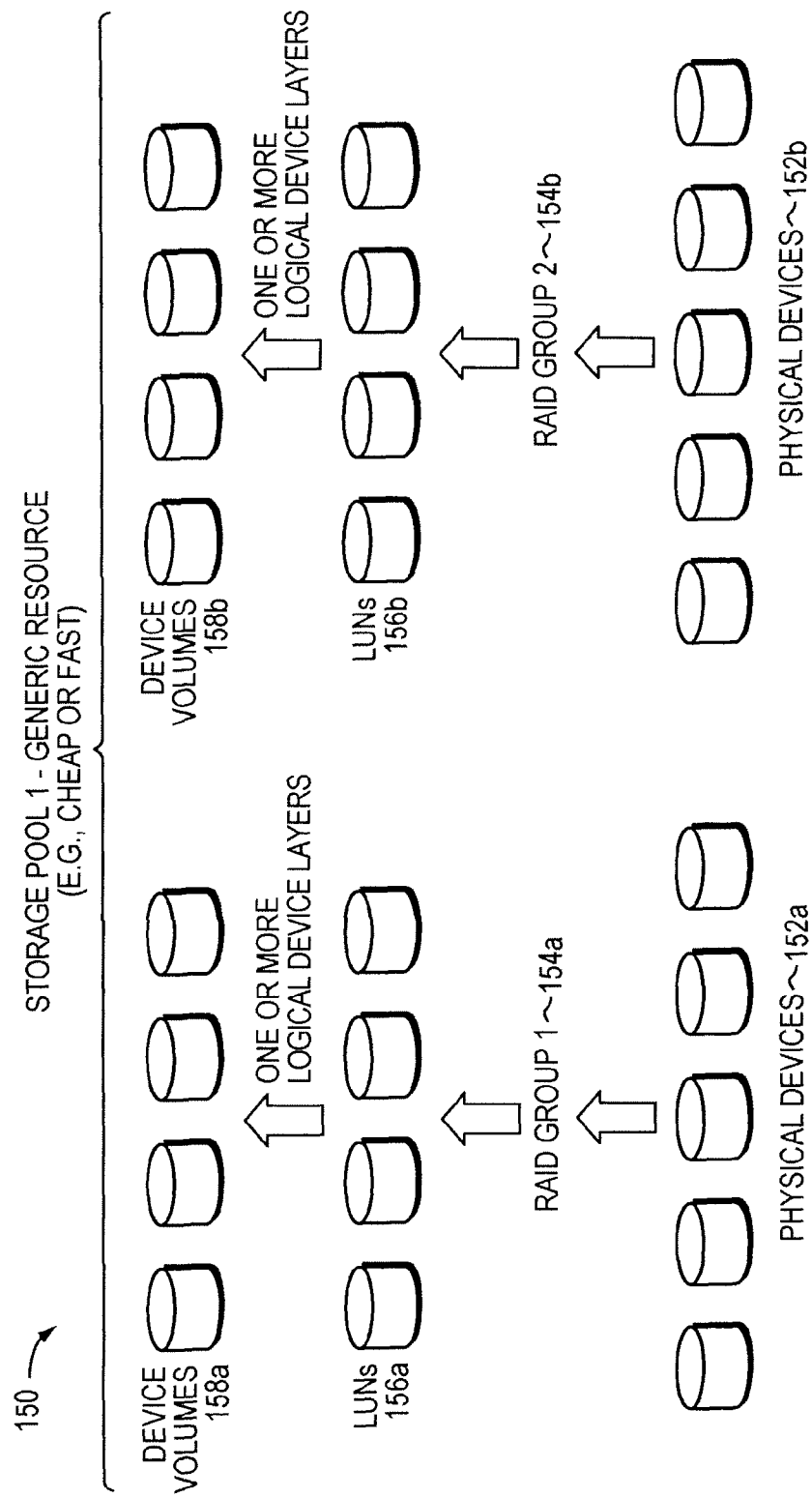
FIG. 3 is an example representation of how storage pools may be configured from physical devices in an embodiment.

Referring to FIG. 3, shown is an example representing how data storage system best practices may be used to form storage pools. The example 150 illustrates how storage pools may be constructed from groups of physical devices. For example, RAID Group 1 154a may be formed from physical devices 152a. The data storage system best practices of a policy may specify the particular RAID level and configuration for the type of storage pool being formed. For example, for physical devices 152a on a first data storage system type when forming a high performance ("FAST") storage pool, RAID-5 may be used in a 4+1 configuration (e.g., 4 data drives and 1 parity drive). The RAID Group 1 154*a* may provide a number of data storage LUNs 156*a*. An embodiment may also utilize one or more additional logical device layers on top of the LUNs 156*a* to form one or more logical device volumes 158*a*. The particular additional logical device layers used, if any, may vary with the data storage system. It should be noted that there may not be a 1-1 correspondence between the LUNs of 156*a* and the volumes of 158*a*. In a similar manner, device volumes 158*b* may be formed or configured from physical devices 152*b*. The storage pool 1 of the example 150 illustrates two RAID groups being used to define a single storage pool although, more generally, one or more RAID groups may be used for form a storage pool in an embodiment using RAID techniques.

The data storage system best practices may define how to configure or form the generic storage pools, each storage pool having an associated generic storage pool type. FIG. 3 illustrates one methodology or framework that may be used to form storage pools in an embodiment. In an embodiment following the methodology of FIG. 3, each underlying data storage system may have associated best practices specifying how to configure storage pools formed from physical devices in that particular data storage system. For example, different data storage systems may have varying best practices in connection with forming a FAST or low cost ("CHEAP") RAID group.

Figure 4:
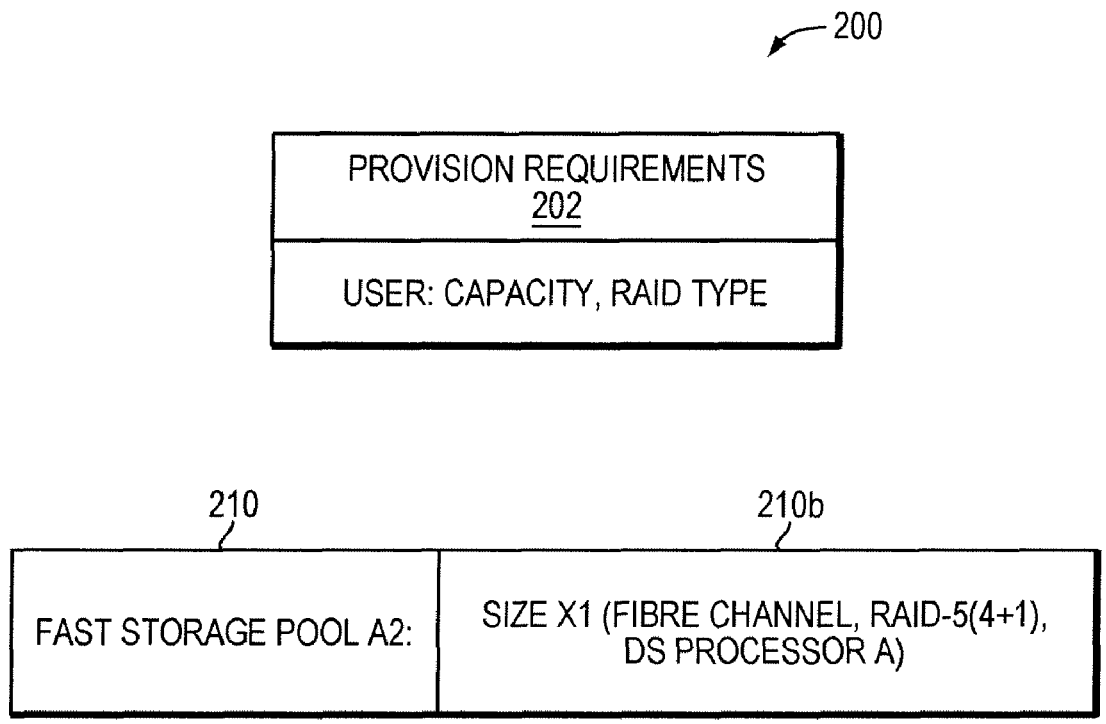
FIGS. 4 and 5 are examples illustrating use of the techniques herein in connection with provisioning storage in an embodiment.

Referring to FIG. 4, shown is an example illustrating use of the techniques herein with the mapping processing as described in connection with FIG. 1. The example 200 includes provision requirements 202 which are input. In this example, the requirements of 202 include a capacity and a RAID type. The user may be requesting that storage be allocated for 5 gigabytes. The best practices may be codified using a script, rules, programming language, and the like, which map the requirements of 202 to storage resource requirements. The currently available resources of the data storage system are examined to see whether the provisioning request may be implemented, i.e., the current state of available resources on the data storage system is examined to determine whether it is possible to allocate resources as needed. It may be that there are insufficient resources available on the data storage system.

Element 210 may represent a storage pool configured from the physical devices of the data storage system. In other words, element 210 may represent a storage pool configured from the physical devices as illustrated in FIG. 3 in accordance with data storage system best practices. Element 210 includes FAST storage pool A2 of SIZE X1. For purposes of illustration, a policy may be in effect which defines FAST storage as preferably formed from Fibre channel devices, and CHEAP storage formed from ATA (Advanced Technology Attachment) devices. 5 Fibre channel drives may be included in the data storage system and processing may be performed to configure these 5 drives into storage pools for use with the techniques herein. In accordance with data storage system best practices, to make use of all 5 drives, a RAID 5 configuration of 4 data drives and 1 parity drive may be preferred. As such, the code implementing the data storage system best practices may result in formation of the FAST storage pool A2. It should also be noted in this example that the data storage system for which the foregoing best practices are defined may be a multiprocessor architecture so that a different data storage system processor may be assigned to service I/O requests in accordance with the FAST or CHEAP storage pool type. In this example, data storage system processor A may be used to service I/O requests for the FAST storage pools and processor B may be used to service I/O requests for a CHEAP storage pool. It may known that processor A may be used to only service the FAST storage pool and processor B may used to service the CHEAP storage pool as well as perform other processing tasks in the data storage system. Thus, such a processor assignment may serve as a factor in the I/O processing rate for the FAST storage pools being higher than that associated with the CHEAP storage pool. In connection with 210, FAST storage pool A2 currently has SIZE X1 amount of storage capacity available for use. Additional properties for the storage pool are indicated in area 210*b*.

It may not be possible to implement a provisioning request due to insufficient available resources on the data storage system. In such instances, processing may be performed to indicate an error or status and recommend installation of additional storage devices in the data storage system in accordance with best practices. However, an embodiment may perform other alternatives and processing.

Figure 5:
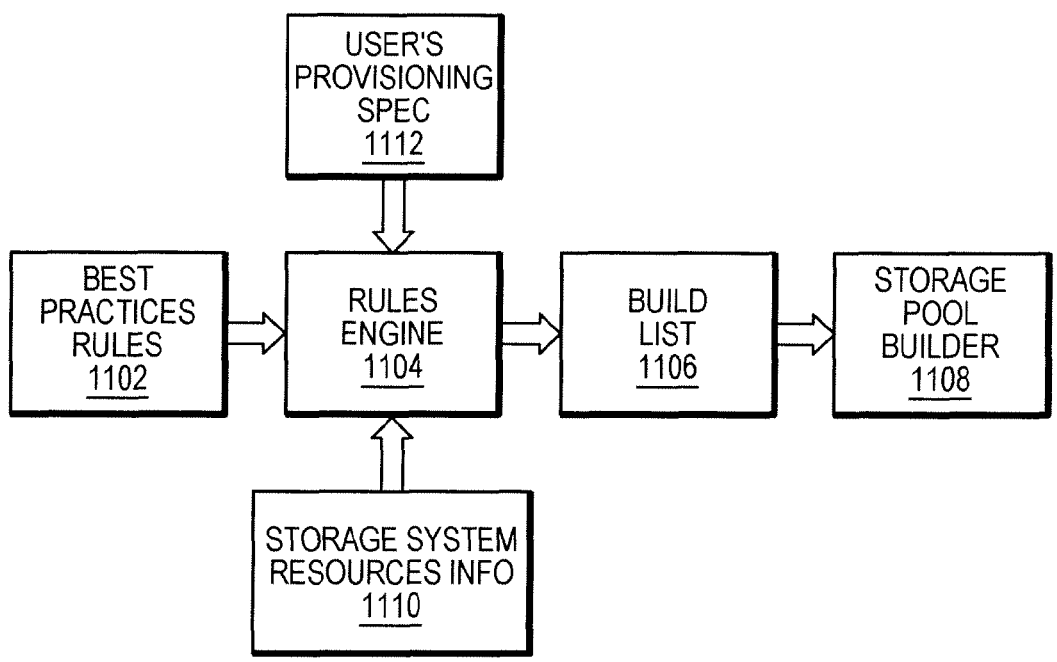

Referring to FIG. 5, shown is an example implementation of stage 122 above in which a rules engine 1104 may be used to derive a build list 1106 from best practices rules 1102, a user's provisioning specification 1112 (which may be, include, or be included in requirements 202 above), and storage system resources information 1110. The build list 1106 may then be used by storage pool builder logic 1108 to satisfy the user's provisioning specification by creating the storage pool. Rules engine 1104 is interprets best practices rules 1102. Best practices rules 1102 operated on by the engine 1104 may be stored in a database. The rules engine 1104 may employ one or more different representations or methods (from a simple look-up table to a complex knowledge based system) in making the build list. Storage system resources information 1110 includes information normally maintained about the storage system about its resources including the locations and types of disks installed in the storage system.

Figure 6:
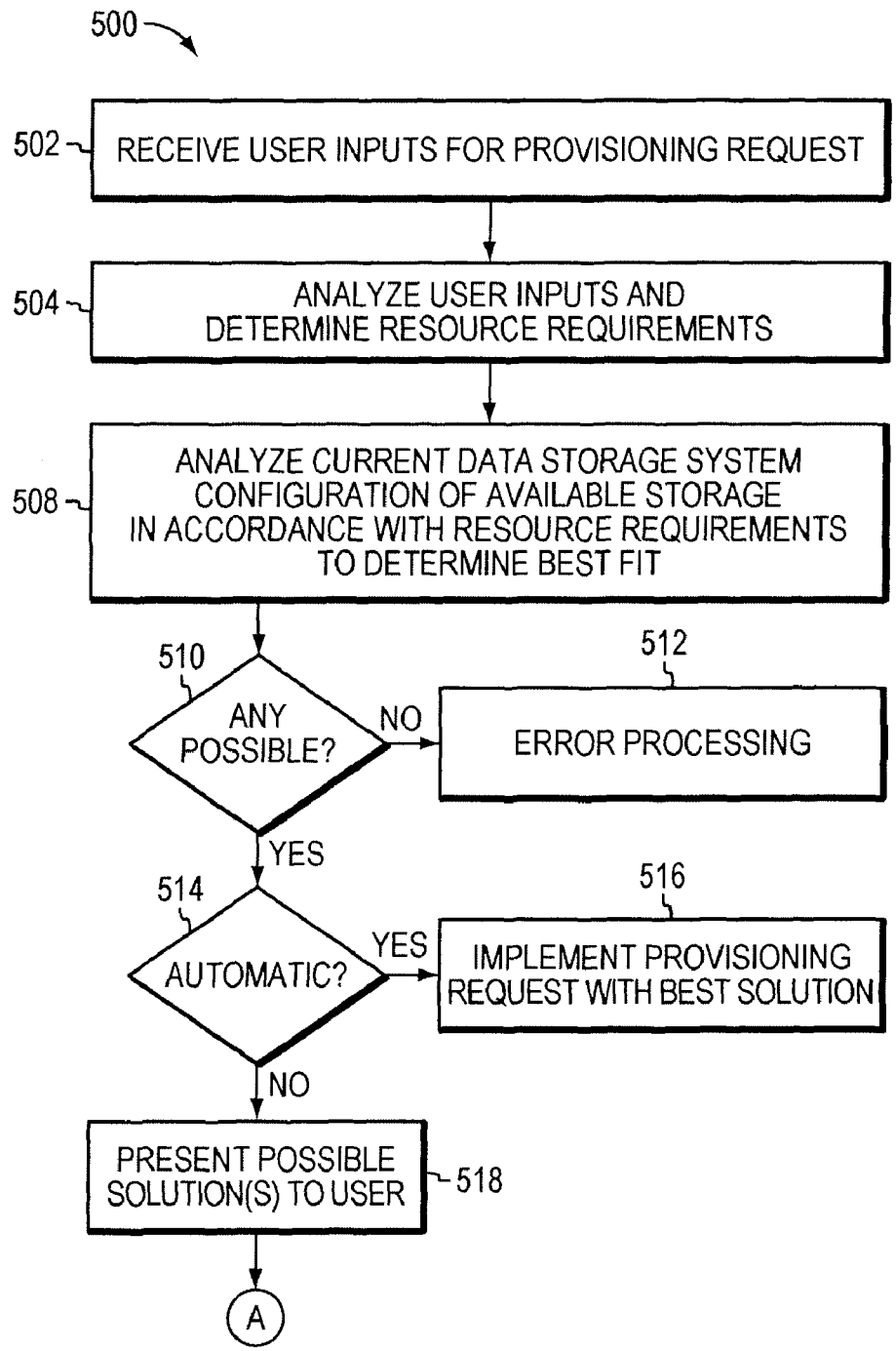
FIGS. 6-8 are flowcharts of processing steps that may be performed in connection with the techniques herein for provisioning storage in an embodiment.
Figure 7:
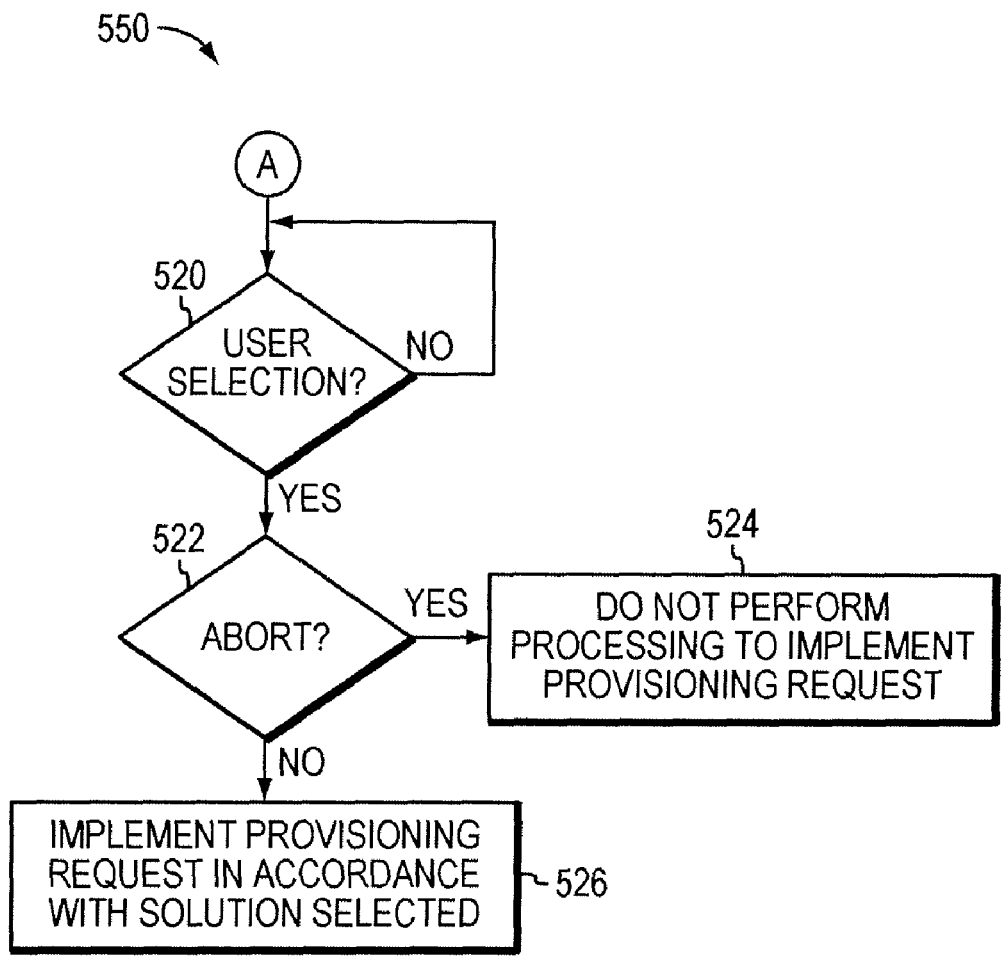

In general, referring to FIGS. 6 and 7, shown are high level flowcharts of processing steps that may be performed in an embodiment in connection with the techniques herein for processing a provisioning request for data storage. The processing steps summarize processing as described above. At step 502, the user inputs for the provisioning request are received. Step 502 includes receiving the provision requirements 102 of FIG. 2. At step 504, the user inputs are analyzed in accordance with the best practices to determine the resource requirements. Step 504 includes performing the mapping or translation stage 122 of FIG. 2. Step 508 analyzes the current data storage system configuration of available storage regarding whether the resource requirements can possibly be implemented in accordance with the currently available resources of the data storage system. At step 510, a determination is made as to whether implementation is possible. If step 510 evaluates to no, control proceeds to step 512 to perform error processing.

If step 510 evaluates to yes, control proceeds to step 514 where a determination is made as to whether automated processing is performed in connection with implementation of the provisioning request. As described herein, an embodiment may perform such automated processing in accordance with configuration settings or options, and the like. If step 514 evaluates to yes, control proceeds to step 516 to automatically implement the provisioning request in accordance with the solution from step 508. The solution may be determined in accordance with a fitness level expressed as a metric. If step 514 evaluates to no, control proceeds to step 518 to present the solution which can be implemented to the user. At step 520, processing waits for a user selection. In one embodiment, a user may be presented with the solution which can be implemented and also an option to abort the provisioning request so that no solution is selected. Once a user inputs a selection, control proceeds to step 522. At step 522, a determination is made as to whether there has been a selection to abort the provisioning request. If so, control proceeds to step 524 where no processing is performed to implement the request. If step 522 evaluates to no, control proceeds to step 526 to implement the provisioning request in accordance with the solution. As will also be described in more detail in following paragraphs, step 526 may include performing processing including configuring physical devices or RAID groups into storage pools depending on the data storage system policy and state of the data storage system.

As described above, data storage configuration processing in connection with configuring physical data storage devices into storage pools for use with the techniques herein may be performed. Additionally different degrees or levels of physical data storage device configuration may be performed at different times. To further illustrate, reference is made to FIG. 3. Data storage devices may be configured for use with the techniques herein to form storage pools. Physical devices may be partitioned and configured into storage pools as part of data storage system initialization or startup. At such a time, the physical devices currently present in the data storage system may be configured into one or more storage pools. As a variation, an embodiment may not configure all physical data storage devices into storage pools as part of startup or initialization processing. Rather, an embodiment may configure a certain amount of storage capacity, number of physical devices, and the like, into storage pools in accordance with a defined policy so that a portion of the physical devices are not associated with a storage pool after data storage initialization processing is complete. As a result, a portion of the physical devices may be configured dynamically or as part of processing a received provisioning request. Such processing may be performed, for example, as part of step 526 processing of FIG. 7 and may allow for configuring the physical devices in accordance with the current provision request. In other words, rather than decide at data storage system initialization time how to configure all available physical devices, a portion of the physical devices may remain unassociated with storage pools so that the portion of physical devices may be so configured in accordance with provision requests actually received. An embodiment may not know at data storage system initialization time how best to configure all the physical devices into storage pools since it may not be known at that time how such data storage may actually be consumed by one or more applications. Binding of a physical device to a storage pool as well as defining which particular data storage processor in a multiple processor data storage system architecture may not be modifiable once specified. As such, an embodiment may choose to form the storage pools and also associate other non-modifiable attributes with data storage at a later point in time.

It should also be noted that an embodiment may elect to partially configure a portion of physical devices in accordance with a data storage system policy. With reference to FIG. 3 beginning at the bottom point or level, a data storage configuration may include forming RAID groups 154*a*, 154*b* from physical devices 152*a*, 152*b*, forming data LUNs 156*a*, 156*b* from RAID groups 154*a*, 154*b*, and forming device volumes 158*a*, 158*b* (and other entities associated with the other logical device layers) from LUNs 156*a*, 156*b*. As such, physical devices may also be partially configured for use with storage pools by performing configuration processing to one of the foregoing configuration processing points or levels. For example, at data storage system initialization time, a first portion of the physical devices may be configured into storage pools. The remaining portion of physical devices may be configured into RAID groups. However, additional processing to form data LUNs and device volumes from the RAID groups may not be performed until a later point in time such as in connection with processing a provisioning request. Data storage may be first allocated from formed storage pools with the remaining portion of physical devices being configured into the appropriate storage groups as needed in accordance with subsequently received provisioning requests. For example, as storage from a first storage pool is allocated for use with provisioning requests, additional RAID groups may be added to the first storage pool. In one embodiment having a multiprocessor data storage architecture, when RAID groups are configured into data storage LUNs, a data storage processor may be assigned to service I/O requests for the LUNs. An embodiment may choose to determine which data storage processor services a LUN (e.g., perform the processor-LUN assignment or binding) at a later point in time after the RAID groups are configured in accordance with current load or tasks being performed by each data storage processor. For example, as described elsewhere herein in more detail, the RAID group configuration may be performed as part of initializing the data storage system or when a new device is detected. Performing the processor-LUN assignment, along with other configuration beyond the RAID group formation, may be performed at one or more later points in time, for example, after one or more provisioning requests have been processed.

Thus, based on the foregoing, data storage device configuration, such as performed at data storage system initialization, may be performed in varying degrees or amounts specified in accordance with several aspects. In accordance with a first aspect, a certain amount of the physical devices may be configured into storage pools. The amount may be determined based on a number of physical devices and associated characteristics such as capacity. The amount may be determined based on forming one or more storage pools to have a threshold amount of configured data storage of one or more types (e.g., a first threshold amount of FAST storage, a second threshold amount of CHEAP storage, a number of storage pools of each type FAST and CHEAP, and the like). In accordance with a second aspect, the physical devices may be configured to varying degrees or levels. For example, as part of data storage initialization processing, a first portion of physical devices may be configured into storage pools ready for use in connection with allocation for generic requirements. A second portion of physical devices may only be configured to the RAID group level so that they may be configured at a later point in time into appropriate storage pools, assigned for servicing by a data storage processor, and the like, in accordance with subsequently received provision requests and data storage system state. As an example, the data storage processor which is assigned to service LUN I/O requests may vary in accordance with which processor is more heavily loaded to provide for load balancing. Also, LUNs of FAST storage pools may be assigned to the least or lesser loaded processors.

Storage devices may also be added to the data storage system as additional storage capacity is needed. As such, the subsequently added devices may be configured when added to the data storage system as well as at some point in time after being added but prior to allocating the storage thereof in connection with a provisioning request. In a manner similar to as described above, newly added devices may be completely configured into storage groups when added, or may be partially configured. The newly added devices may be partially configured in accordance with a first aspect as described above by only configuring a portion of physical devices into storage pools. In accordance with another aspect, a newly added device may be partially configured in that a physical device may be configured to the RAID group or other configuration level so that the physical device-storage pool binding is not complete. It should be noted that, with reference to FIG. 3, an embodiment may include other levels or stages in connection with configuring physical devices into storage pools for use with the techniques herein. An embodiment may partially configure one or more physical devices by performing configuration processing to a point, such as associated with level or stage 154, 156, and/or 158. The reasons for performing configuration to a particular level or stage with reference to FIG. 3 may vary with the particular data storage system best practices and policy.

In accordance with the techniques herein, best practices, and thus the code implementing the same, may change over time. For example, best practices may be change as new features are added, with a software version upgrade, as runtime behavior and application implementation associated with an existing feature changes, as best practices are improved with better ways of implementation, and the like. In connection with a modification to a best practice, an embodiment implementing such best practices using a policy may download new rules, a new code module, script, and the like, which implements the current best practices. A new script or set of rules may be downloaded to the data storage system, for example, from a vendor or VAR (value added reseller) website or other network location as well as from storage local to the data storage system, such as from a CD, USB or flash memory device, and the like.

In accordance with the techniques herein, a data storage vendor may supply an implementation of data storage system best practices in the form of a policy. Another party, such as a VAR, may supply an implementation of best practices in the form of a policy for VAR-supplied systems.

Figure 8A:
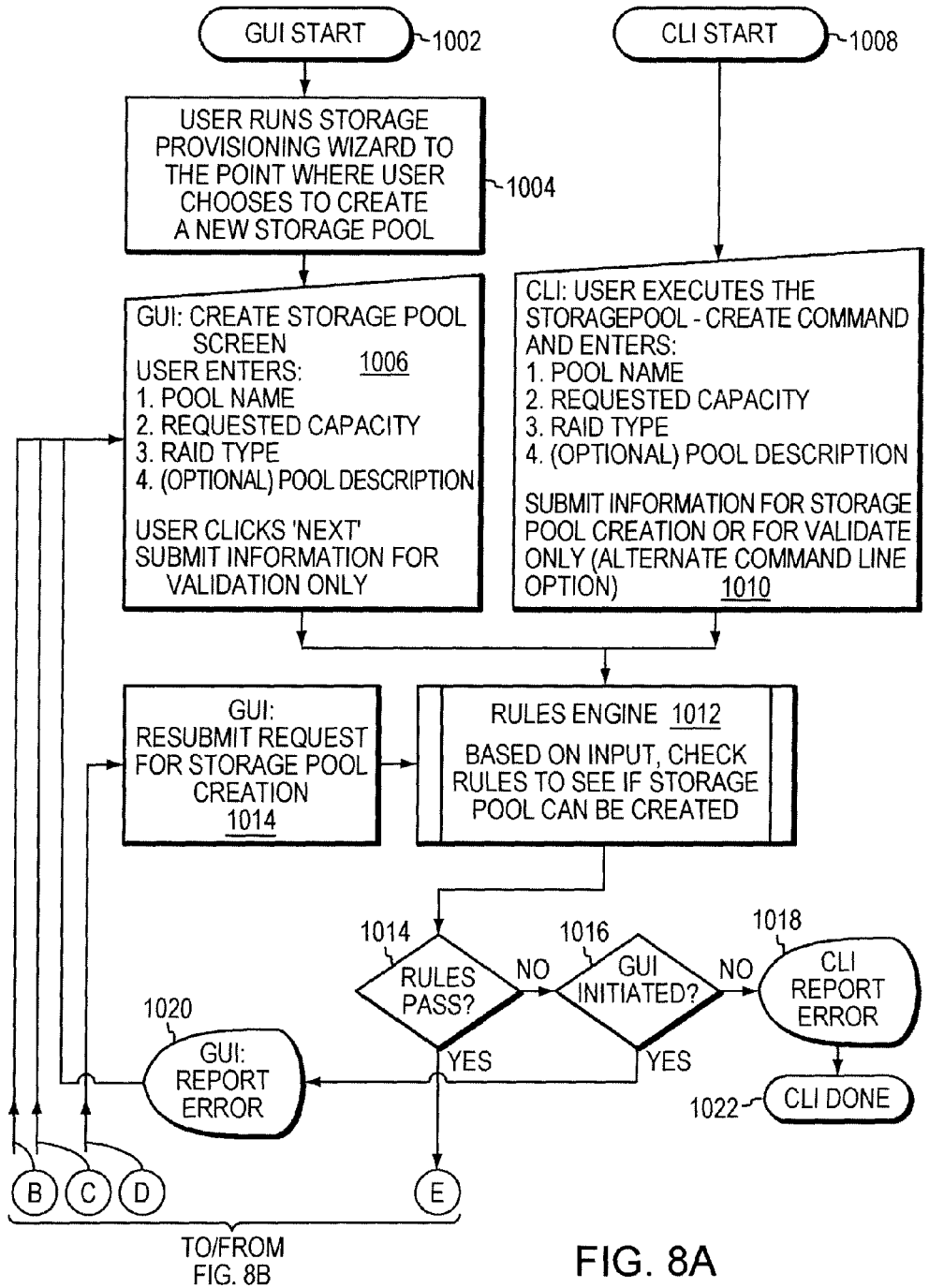
Figure 8B:
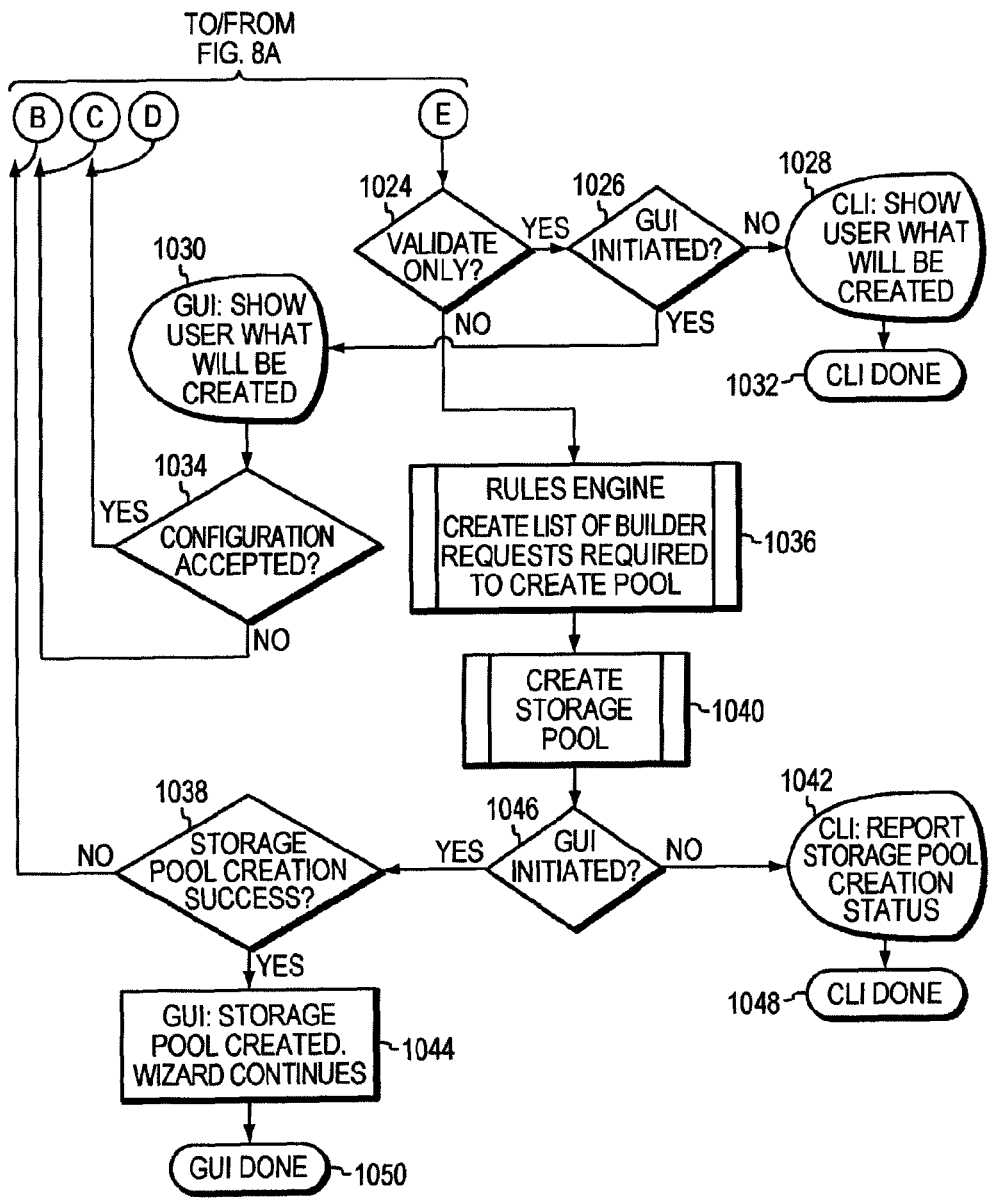
Figure 9:
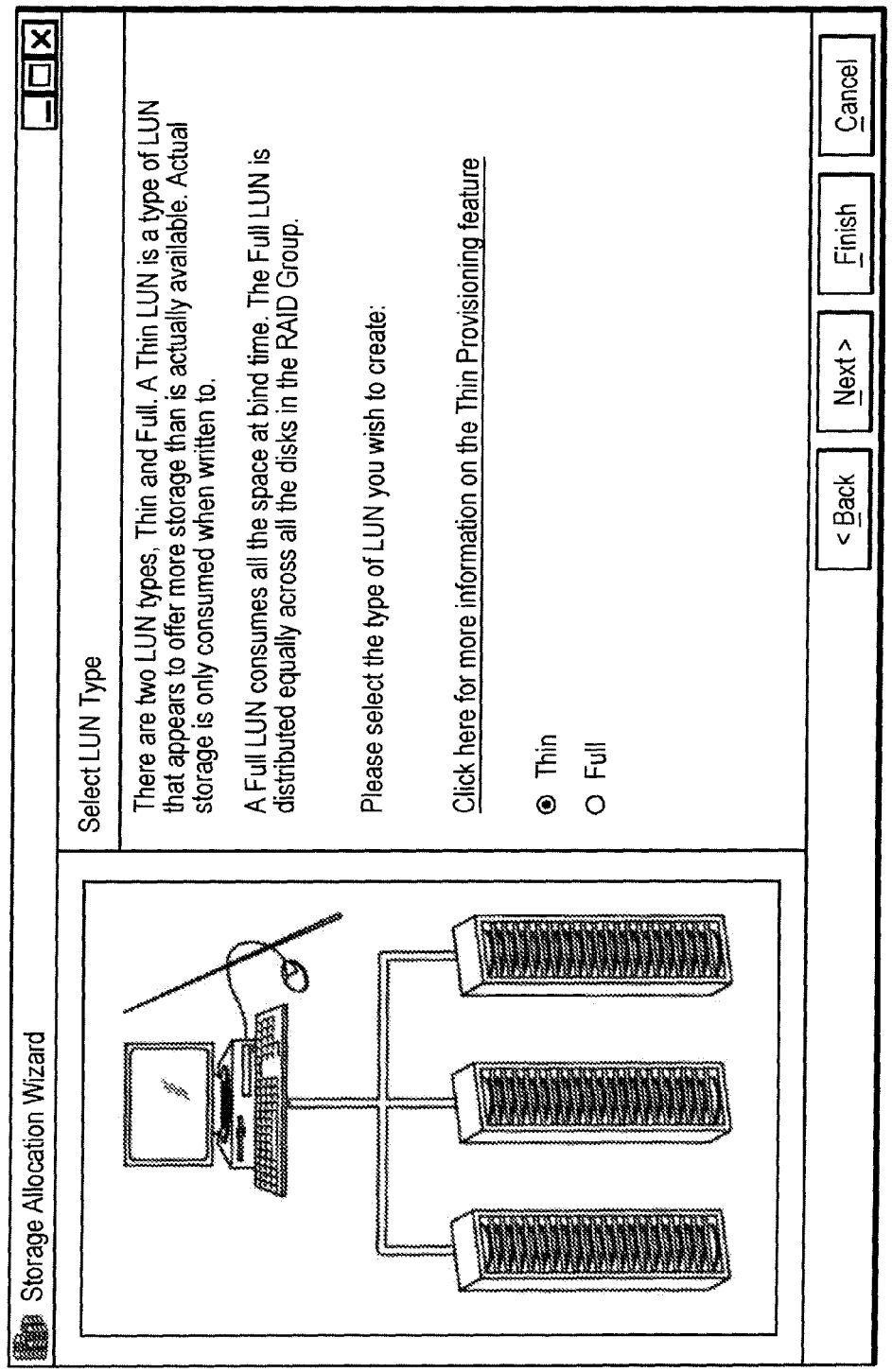
Figure 10:
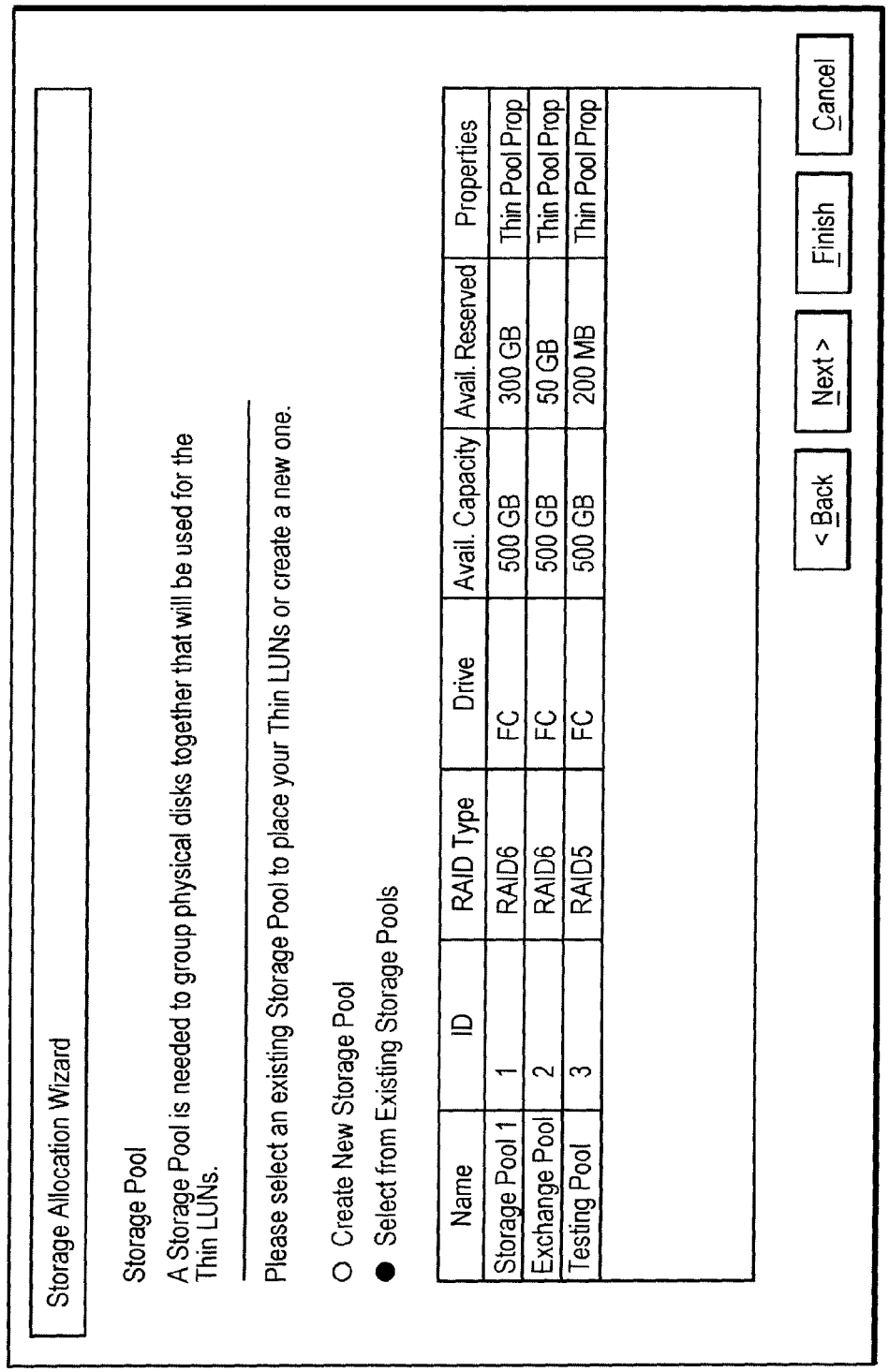

FIG. 8 illustrates a lower level flowchart showing an example process in accordance with the provisioning technique. The process may be executed from a graphical user interface (GUI) and/or from a command line interface (CLI), e.g., depending on user proficiency. Steps 1002, 1004, 1006, 1014, 1020, 1030, 1034, 1038, 1044, 1050 are specific to the GUI, and steps 1008, 1010, 1018, 1022, 1028, 1032, 1042, 1048 are specific to the CLI. Starting with the GUI (step 1002), the user runs a storage provisioning wizard to a point at which the user chooses to create a new storage pool (step 1004). In one example, the user may reach this point after selecting a "thin" LUN on a screen as shown in FIG. 9 and selecting "create new storage pool . . . " on a screen as shown in FIG. 10. At a create storage pool screen such as the screen shown in FIG. 11, the user specifies at least a requested capacity and a RAID type for the new storage pool (step 1006).

Starting with the CLI (step 1008), the user executes a storagepool—create command and enters at least a requested capacity and a RAID type for the new storage pool (step 1010).

In at least one embodiment in the GUI and/or CLI, the user may specify a validate only mode which affects processing as described below.

The requested capacity and RAID type are submitted to rules engine 1104 where it is determined whether the new storage pool can be created (step 1012, 1014). If not, an error is reported (steps 1016, 1018, 1020), and the process terminates in the CLI case (step 1022). In the GUI case, after the error is reported, the process returns to step 1006.

If the new storage pool can be created, it is determined whether validate only mode has been specified (step 1024). If so, the user is presented with a report showing what would be created (steps 1026, 1028, 1030), and the process terminates in the CLI case (step 1032). In the GUI case, after the report is presented, if the configuration is not accepted (step 1034), the process returns to step 1006; if the configuration is accepted, the request is resubmitted (step 1014). Thus the validate only mode may be used iteratively by the user in testing variations of the user's specification to help educate the user as to acceptable or advisable configurations that may be available.

If validate mode has not been specified, the rules engine creates build list 1106 of requests to create the storage pool (step 1036). Based on list 1106, builder 1108 executes to create the storage pool (step 1040). In the CLI case, status of the execution is reported (steps 1046, 1042) and the process terminates (step 1048). In the GUI case, if the execution was successful (step 1038), creation of the storage pool is reported and the wizard continues (step 1044); process terminates (step 1050). In the GUI case, if the execution was not successful, the process returns to step 1006.

With respect to the GUI, in a specific embodiment as shown in FIG. 9, the user enters a RAID type and capacity, and optionally a storage pool name and storage pool description, for the storage pool (e.g., a thin storage pool). Capacity can be specified in size units (gigabytes (GB), terabytes (TB)) or by percentage of available storage space on the storage system. RAID 5 may be the default RAID type and may be the recommended RAID type for particular storage pools (e.g., thin storage pools).

A total available physical capacity field may be read only and may show how much total physical disk space is currently available on the storage system. A pie chart may be displayed to graphically depict the total space on the storage system and the portion that is being used and the portion that is available.

A "Show Storage Pool creation details when 'Next' is clicked" checkbox, when enabled, may cause a pop-up dialog to be displayed showing the details of how the storage pool will be created. This may include such information as how many disks were chosen, the bus and enclosures used, and the total size of the storage pool since it may be somewhat larger than what was requested given the disks available on the storage system.

When the user presses a "Next" button, a best practices model, e.g., implemented in a thin rules library, may be used to determine the number of disks that each RAID group within the storage pool will contain by mapping the capacity to disks. The rules engine may configure the disks to exactly match the capacity or to be greater than the required capacity if an exact match cannot be made. If the storage pool cannot be created within the compounds of best practices, appropriate warning or error messages may be displayed. For example, if the only disks available to create the storage pool would result in mixed drive type (e.g., ATA and Fibre Channel), the result shown to the user may state that the request could not be completed. Furthermore, for this condition, the user may be directed to use a "Create Storage Pool" dialog to manually choose disks if the user wishes to mix drive types. Also, mixing disk capacities in order to fulfill the capacity may result in a similar message.

With respect to the rules engine, options also include configurations that accommodate the capacity request with a slightly smaller number.

The following are examples of best practices implemented in the rules.

1. Disks that have different capacities are not mixed in a RAID group, as it results in waste of usable disk space.
2. Fibre channel Disks are not mixed with ATA disks in a pool, as it affects the performance of the pool.
3. Each RAID group in the pool has a defined number of disks that gives optimal performance for the selected RAID protection.

Sample user requirements are as follows:
Capacity=10 GB
RAID protection=RAID 5

Applying best practices for the above requirements may result in the following. Option 1 is aimed at high performance, while Option 2 is aimed at low cost.

| Option 1 - High Performance (Default) Virtual Pool capacity 10.8 GB FC disks; each RAID group has 5 disks | | |
|---|---|---|
| Disks | Capacity | Drive Type |
| RAID Group 1 | | |
| Bus 0 Enclosure 1 Disk 0 | 1 GB | FC |
| Bus 0 Enclosure 1 Disk 1 | 1 GB | FC |
| Bus 0 Enclosure 1 Disk 2 | 1 GB | FC |
| Bus 0 Enclosure 1 Disk 3 | 1 GB | FC |
| Bus 0 Enclosure 1 Disk 4 | 1 GB | FC |
| RAID Group 2 | | |
| Bus 0 Enclosure 1 Disk 5 | 1 GB | FC |
| Bus 0 Enclosure 1 Disk 6 | 1 GB | FC |
| Bus 0 Enclosure 1 Disk 7 | 1 GB | FC |
| Bus 0 Enclosure 1 Disk 8 | 1 GB | FC |
| Bus 0 Enclosure 1 Disk 9 | 1 GB | FC |
| RAID Group 3 | | |
| Bus 0 Enclosure 1 Disk 10 | 1 GB | FC |
| Bus 0 Enclosure 1 Disk 11 | 1 GB | FC |
| Bus 0 Enclosure 1 Disk 12 | 1 GB | FC |
| Bus 0 Enclosure 1 Disk 13 | 1 GB | FC |
| Bus 0 Enclosure 1 Disk 14 | 1 GB | FC |

| Option 2 - Low cost Virtual Pool Capacity 18 GB ATA disks; each RAID group has 5 disks RAID Group 1 | | |
|---|---|---|
| Disks | Capacity | Drive Type |
| Bus 0 Enclosure 1 Disk 0 | 5 GB | ATA |
| Bus 0 Enclosure 1 Disk 1 | 5 GB | ATA |
| Bus 0 Enclosure 1 Disk 2 | 5 GB | ATA |
| Bus 0 Enclosure 1 Disk 3 | 5 GB | ATA |
| Bus 0 Enclosure 1 Disk 4 | 5 GB | ATA |

An embodiment may implement the techniques herein using code executed by a computer processor. For example, an embodiment may implement the techniques herein using the rules, rules engines, and the like, using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing storage pool provisioning, the method comprising:
configuring one or more physical devices of a data storage system for use in connection with provisioning a storage pool;
providing one or more user interfaces for the data storage system, each user interface providing a different level of abstraction of the data storage system based on a different level of user proficiency associated with each user interface;
receiving a provisioning specification describing a RAID type and capacity, wherein the provisioning specification varies in accordance with a selected user interface;
receiving a rule describing one or more sets of data storage system best practices, each of said one or more sets specifying data storage system best practices for a different type of data storage system including a first type associated with the data storage system; and
performing configuration processing in connection with initialization of said data storage system to configure a first portion of said one or more physical devices for use with the storage pool, wherein a rules engine and best practices for said first type of data storage system specified in said rule are used in performing said configuration processing.

2. The method of claim 1, further comprising:
using the rules engine to translate the provisioning specification into a best practices configuration that the data storage system can support.

3. The method of claim 1, further comprising:
allowing options based on best practices for a more advanced user.

4. The method of claim 1, further comprising:
allowing the user to specify just the capacity and RAID type, and automatically determining how best to fulfill the requested specification.

5. The method of claim 1, further comprising:
using a best practices engine to validates provisioning specification.

6. The method of claim 1, further comprising:
receiving the provisioning specification via a command line interface.

7. The method of claim 1, further comprising:
allowing the user to invoke the rules engine in a validate only mode.

8. The method of claim 1, further comprising:
determining, based on the provisioning specification, whether the storage pool can be created.

9. The method of claim 1, further comprising:
determining, based on the provisioning specification, whether the storage pool can be created; and
determining whether a validate only mode has been specified.

10. The method of claim 1, further comprising:
providing a validate only mode that can be used iteratively to test variations of the provisioning specification.

11. The method of claim 1, further comprising:
based on the rules engine, creating a build list of requests to create the storage pool.

12. The method of claim 1, further comprising:
based on the rules engine, creating a build list of requests to create the storage pool; and
based on the build list, creating the storage pool.

13. The method of claim 1, further comprising:
performing the configuration processing in response to a user interface wizard.

14. The method of claim 1, wherein capacity is specified by percentage of available storage space on the storage system.

15. The method of claim 1, further comprising:
displaying a pie chart to graphically depict the total space on the storage system.

16. The method of claim 1, further comprising:
showing the details of how the storage pool will be created.

17. The method of claim 1, further comprising:
using a best practices model to determine the number of disks that each RAID group within the storage pool will contain by mapping the capacity to disks.

18. The method of claim 1, further comprising:
if the only disks available to create the storage pool would result in mixed drive type, stating that the request could not be completed.

19. The method of claim 1, further comprising:
avoiding mixing disks that have different capacities in a RAID group.

20. The method of claim 1, further comprising:
avoiding mixing fibre channel disks with ATA disks in the storage pool.

* * * * *